(12) United States Patent  
Main

(10) Patent No.: US 7,178,215 B2
(45) Date of Patent: Feb. 20, 2007

(54) INSTRUMENTED TRANSITION ALIGNMENT FIXTURE AND METHOD

(75) Inventor: Michael Alan Main, Tomball, TX (US)

(73) Assignee: Siemens Power Generation, Inc., Orlando, FL (US)

( * ) Notice: Subject to any disclaimer, the term of this patent is extended or adjusted under 35 U.S.C. 154(b) by 71 days.

(21) Appl. No.: 10/637,336

(22) Filed: Aug. 8, 2003

(65) Prior Publication Data

US 2005/0028340 A1 Feb. 10, 2005

(51) Int. Cl.
*B23Q 3/00* (2006.01)

(52) U.S. Cl. .............. 29/407.05; 29/407.09; 29/407.1; 29/464; 29/559; 29/709; 29/714; 29/720; 29/721; 269/909

(58) Field of Classification Search ............ 29/888.01, 29/888.011, 407.01, 407.05, 407.08, 407.09, 29/407.1, 464, 525.02, 559, 705, 709, 714, 29/720, 721, 281.1; 73/865.9, 866.5, 119 R, 73/118.1; 33/710, 501.02, 501.05, 504, 655, 33/661, 547, 549, 555, 558

See application file for complete search history.

(56) References Cited

U.S. PATENT DOCUMENTS

| | | | |
|---|---|---|---|
| 4,596,952 A | 6/1986 | Goff et al. | |
| 4,659,988 A | 4/1987 | Goff et al. | |
| 4,660,294 A | 4/1987 | Schmidt | |
| 4,718,170 A | 1/1988 | Wheeler | |
| 5,627,761 A | 5/1997 | Pollard | |
| 6,026,693 A * | 2/2000 | Baumoel et al. | 73/861.27 |
| 6,122,956 A * | 9/2000 | Klausner et al. | 73/61.71 |
| 6,463,813 B1 * | 10/2002 | Gysling | 73/862.59 |
| 6,568,091 B1 | 5/2003 | Mercer et al. | |

* cited by examiner

Primary Examiner—Jermie E. Cozart

(57) ABSTRACT

Aspects of the invention relate to a fixture and a method to assist in the alignment of the inlet end of a transition duct and a combustor component in a turbine engine. The fixture includes a plurality of pressure transducers spaced on a mandrel so as to correspond to the target alignment location of the transition. The plurality of pressure transducers produce signals, which can be converted by a signal processor into an actual alignment location signal. A display can be provided for presenting graphical images of the target alignment location and the actual alignment location responsive to the actual alignment location signal received from the signal processor. Thus, a user can view the movement of the graphical image of the actual alignment location relative to the graphical image of the target alignment location such that the user can adjust the transition's position until the graphical images are substantially aligned.

20 Claims, 4 Drawing Sheets

INSTRUMENTED TRANSITION ALIGNMENT FIXTURE AND METHOD

FIELD OF THE INVENTION

The invention relates in general to turbine engines and, more particularly, to an apparatus for aligning a transition duct with the combustor section of a turbine engine and an associated alignment method.

BACKGROUND OF THE INVENTION

Turbine engines generally include three sections: a compressor section, a combustor section and a turbine section. In some turbine engine designs, a duct, known as a transition, extends between the combustor section and turbine section. The transition serves many purposes, one of which is to direct the hot gases produced in the combustor section to the turbine section.

Precise alignment between the inlet end of the transition and the combustor section is critical for proper engine operation. Current methods of achieving alignment involve roughly aligning the transition inlet end with a component near the combustor exit so that downstream seals and clamps can be installed. Dial indicators are then swept about the inner periphery of the inlet end of the transition to verify the alignment location. If necessary, the downstream clamps are then adjusted in incremental alignment moves. After each move, measurements are taken using the dial indicators. The process continues until the dial indicator measurements show that the inlet end of the transition is in the correct position. Once the transition is satisfactorily aligned with the combustor section, the alignment information can be recorded by a technician.

While these methods have been successfully used to align the transition, such methods can be time consuming, labor intensive and prone to human error.

SUMMARY OF THE INVENTION

Thus, one object according to aspects of the present invention is to provide an apparatus to facilitate the process of aligning a transition to the combustor section of a turbine engine. Another object according to aspects of the present invention is to graphically display in real-time the actual alignment location of the transition relative to a target alignment location such that a viewer can discern the magnitude and direction of any misalignment between the transition and the combustor section. Yet another object according to aspects of the present invention is to reduce the use of dial indicators in the alignment process. A further object according to aspects of the present invention is to guide a technician during alignment by providing information as to the magnitude and direction of any misalignment between the combustor section component and the transition. Still another object according to aspects of the invention is to provide markings to allow measurement of the alignment in comparison to acceptance criteria. An additional object according to aspects of the present invention is to provide a method for aligning a transition duct with the combustor section of a turbine engine. Objects according to aspects of the invention further relate to minimizing the need for manual recordation of alignment information. These and other objects according to aspects of the present invention are addressed below.

Aspects of the present invention relate to a fixture for aligning the inlet end of a transition with the combustor section of a turbine engine. The fixture includes a flange, a mandrel and a plurality of pressure transducers. The flange is adapted for mounting to a combustor section component of a turbine engine. The mandrel has an outer peripheral surface and extends substantially perpendicularly from the flange. Further, the mandrel is sized and shaped to correspond to a target alignment location of the transition. In one embodiment, the mandrel can be substantially cylindrical. The plurality of pressure transducers are spaced on the outer peripheral surface of the mandrel so as to correspond to the target alignment location of the transition. The plurality of pressure transducers produce signals.

The fixture can further include a signal processor operatively connected with the plurality of pressure transducers. The signal processor can be one from the group of central processing units, digital signal processors, or application specific integrated circuits. The signal processor can generate an actual alignment location signal responsive to the signals received from the plurality of pressure transducers. In addition, the fixture can include a display that presents a graphical image representative of the target alignment location. The display can further present a graphical image representative of an actual alignment location responsive to the actual alignment location signal received from the signal processor. Thus, a user can view the movement of the graphical image of the actual alignment location relative to the graphical image of the target alignment location such that the user can make informed corrections to the transition until the graphical images are substantially aligned.

The display's presentment of the graphical image representative of the target alignment location can be an electrical portrayal or it can be a physical portrayal. The display's presentment of the graphical image representative of the actual alignment location can be an electrical portrayal. Further, the graphical images representative of the target alignment location and the actual alignment locations can be presented as circles. In such case, the graphical image representative of the target alignment location includes graduations extending radially inward and outward from the circle. Alternatively, the graphical images representative of the target alignment location and the actual alignment locations can be presented as cross-hairs, and the graphical image representative of the target alignment location can also include graduations along axes of the cross-hairs.

The fixture can further include a data collection system operatively associated with the display and the signal processor. The data collection system can be configured to selectively record alignment information received from the display and signal processor.

Other aspects according to the invention are directed to a method of aligning the inlet end of a transition with the combustor section of a turbine engine. The method can include a number of steps including those listed below.

(a) Providing a combustor section component of a turbine engine.

(b) Providing a generally hollow transition duct having an inlet end, an outlet end, and an inner periphery.

(c) Providing a fixture. The fixture includes a flange, a mandrel and a plurality of pressure transducers. The flange is adapted for mounting to the combustor section component. The mandrel extends substantially perpendicularly from the flange. The mandrel is sized and shaped to correspond to a target alignment location of the transition. The mandrel has an outer peripheral surface. The plurality of pressure transducers are spaced on the outer peripheral surface of the mandrel so as to correspond to the target alignment location of the transition. The plurality of pressure transducers produce signals.

(d) Mounting the fixture to the combustor section component such that at least a portion of the mandrel including the plurality of pressure transducers extends beyond the combustor component. The fixture can be mounted to the combustor section component using bolts.

(e) Placing the inlet end of the transition over the extending portion of the mandrel such that each of the plurality of pressure transducers substantially engage the inner periphery of the transition.

(f) The plurality of pressure transducers generating a signal in response to pressure exerted on the transducers by the transition.

(g) Providing a signal processor operatively connected with the plurality of pressure transducers. The signal processor generates an actual alignment location signal responsive to the signals received from the plurality of pressure transducers.

(h) Providing a display operatively connected to the signal processor. The display presents a graphical image representative of the target alignment location. The display further presents a graphical image representative of an actual alignment location responsive to the actual alignment location signals received from the signal processor. The graphical images representative of the target alignment location and the actual alignment locations can be presented as circles or they can be presented as cross-hairs.

(i) Comparing the graphical image of the target alignment location to the graphical image of the actual alignment location.

The method can also include the following steps:

(j) Adjusting the transition so as to reduce any misalignment, in magnitude and/or direction, between the graphical image of the target alignment location and the graphical image of the actual alignment location. The adjusting can include moving the outlet end of the transition.

(k) Repeating steps (f)–(j) until the graphical image of the target alignment location is substantially aligned with the graphical image of the actual alignment location.

(l) Providing a data collection system operatively associated with the signal processor and the display. The data collection system can be configured to selectively record alignment information received from the signal processor and the display.

(m) Operating the data collection system to record alignment information received from the signal processor and display.

DETAILED DESCRIPTION OF EMBODIMENTS OF THE INVENTION

Aspects of the present invention address the drawbacks associated with prior transition alignment techniques. Aspects of the present invention relate to a fixture that can assist in the process of aligning the inlet end of a transition duct to an exit portion of the combustor section of a turbine engine. Other aspects of the present invention relate to a method of aligning a transition and a combustor section using such a fixture.

Embodiments of the invention will be explained in the context of a transition alignment fixture, but the illustrated application is intended only as exemplary. Embodiments of the invention are shown in FIGS. 1–5, but the present invention is not limited to the illustrated structure or application.

Figure 1:
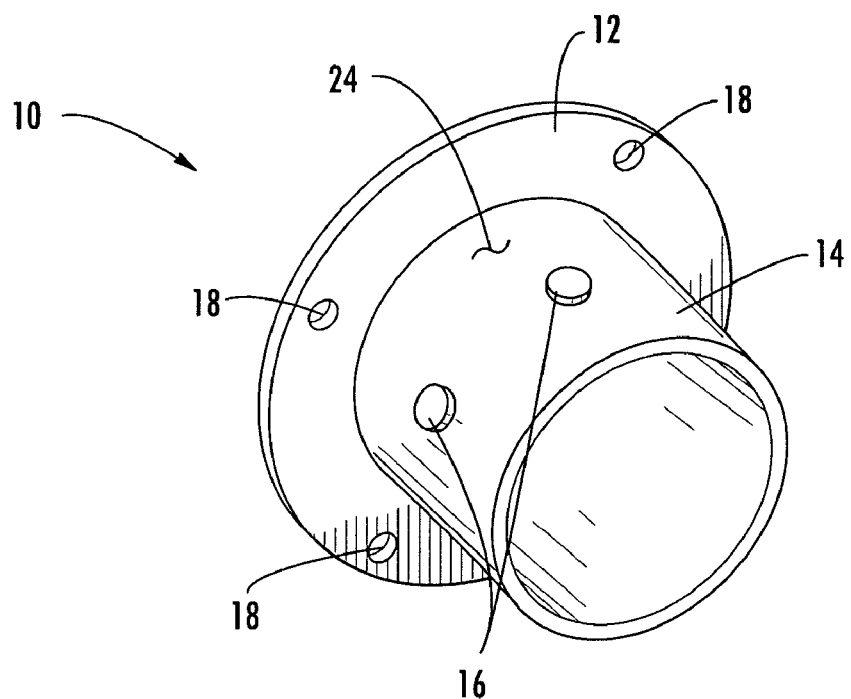
FIG. 1 is an isometric view of a fixture according to aspects of the invention.
Figure 2:
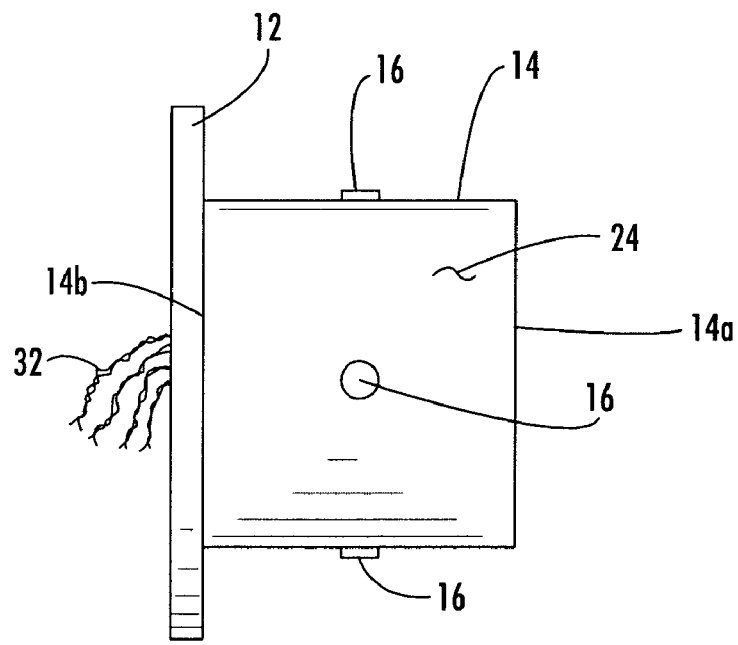
FIG. 2 is a side elevational view of a fixture according to aspects of the invention.

As shown in FIGS. 1–2, aspects of the present invention relate to a fixture 10 for aligning the inlet end of a transition with the combustor section of a turbine engine. The fixture 10 can include a variety of components including a flange 12, a mandrel 14, and a plurality of pressure transducers 16. Each of these components will be discussed in turn below.

The flange 12 can be adapted for mounting to a combustor section component of a turbine engine. Adapted for mounting to a combustor section component of a turbine engine means that the flange 12 includes one or more features allowing the flange 12 to be mounted to the combustor component. In one embodiment, the flange 12 can include a plurality of openings 18 that correspond to a pre-existing bolt hole pattern on the combustor component. Alternatively, the flange 12 can include clamps for securing the flange 12 to the combustor component. In addition, the flange 12 may be contoured or configured so as to only fit against an engaging surface on the combustor component in a particular orientation or in a particular area. The flange 12 can have just about any configuration. For example, the flange 12 can be substantially circular, rectangular, or polygonal in conformation. As shown in FIG. 2, the flange 12 can be a plate that at least partially closes off one end of the mandrel. Alternatively, the flange 12 can be a ring-like structure that skirts around one end of the mandrel 14.

The combustion section 20 of the turbine engine includes a component 22 to which the flange 12 of the fixture 10 mounts. Depending on the combustor design, the component 22 can be any component 22 in the combustor section 20 such as the combustor cylinder or portal.

The mandrel 14 can extend substantially perpendicularly from the flange 12. The term substantially perpendicular includes true perpendicular as well as deviations therefrom. The mandrel 14 includes an outer peripheral surface 24. In one embodiment, the mandrel 14 can be substantially cylindrical in conformation, but various other configurations are possible. The mandrel 14 can be a solid piece or, preferably, the mandrel 14 can be substantially hollow for weight reduction and other purposes. The axial ends 14a,14b of the mandrel 14 can be either open or closed. Further, the mandrel 14 can be sized and shaped to correspond to a target alignment location of the transition 26. In other words, the mandrel 14 is configured such that when the transition inlet mouth or inlet ring 28 is placed over the mandrel 14, the mandrel 14 can physically hold the transition 26 in the generally proper alignment position.

The mandrel 14 can be made of numerous materials, but, preferably, it is made of a rigid steel. However, the mandrel 14 can also be made of other materials like metals, plastics or composites that provide sufficient rigidity to support the weight of the transition 26.

The mandrel 14 and the flange 12 can be joined in any of a variety of manners. For example, the mandrel 14 and the flange 12 can be joined by brazing, welding, fasteners, or adhesives, to name a few. Alternatively, the flange 12 and mandrel 14 can be made as a single part construction such as by casting.

The fixture 10 can further include a plurality of pressure transducers 16. A pressure transducer 16 generally refers to any device that converts pressure into an electrical signal through a measurement of either displacement, strain, or piezoelectric response. However, a variety of devices can fall within the scope of the term pressure transducer such as load cells, diaphragm-type pressure transducers, proximity sensors, displacement-type pressure transducers, and linear variable-differential transformers (LVDT).

The plurality of pressure transducers 16 can be spaced on the outer peripheral surface 24 of the mandrel 14 so as to correspond to the target alignment location of the transition 26. The plurality of pressure transducers 16 can be sized such that each transducer 16 would be slightly loaded when the inlet end 28 of the transition 26 is held in the correct alignment position by the mandrel 14. Each of the plurality of pressure transducers 16 produces a signal.

Almost any number of pressure transducers 16 can be used in a fixture 10 according to aspects of the invention. In one embodiment, there are at least three pressure transducers 16. Preferably, there at least four pressure transducers 16. In any case, it is further preferable if an even number of pressure transducers 16 are used. Regardless of the exact quantity, the pressure transducers 16 are preferably equally spaced about the outer periphery 24 of the mandrel 14. For example, when four pressure transducers 16 are used, they can be placed in substantially the 12, 3, 6 and 9 o'clock positions. Further, the pressure transducers 16 can be substantially disposed along a single peripheral line.

The pressure transducers 16 can be secured to the outer periphery 24 of the mandrel 14 in any of a number of manners. For example, the pressure transducers 16 can be secured to any portion of the mandrel 14 using bolts or other fasteners. Alternatively, the pressure transducers 16 can be secured to the mandrel 14 by epoxies or adhesives. In such case, localized recesses or spot faces can be provided in the outer periphery 24 of the mandrel 14 to accommodate the pressure transducers 16.

Figure 4:
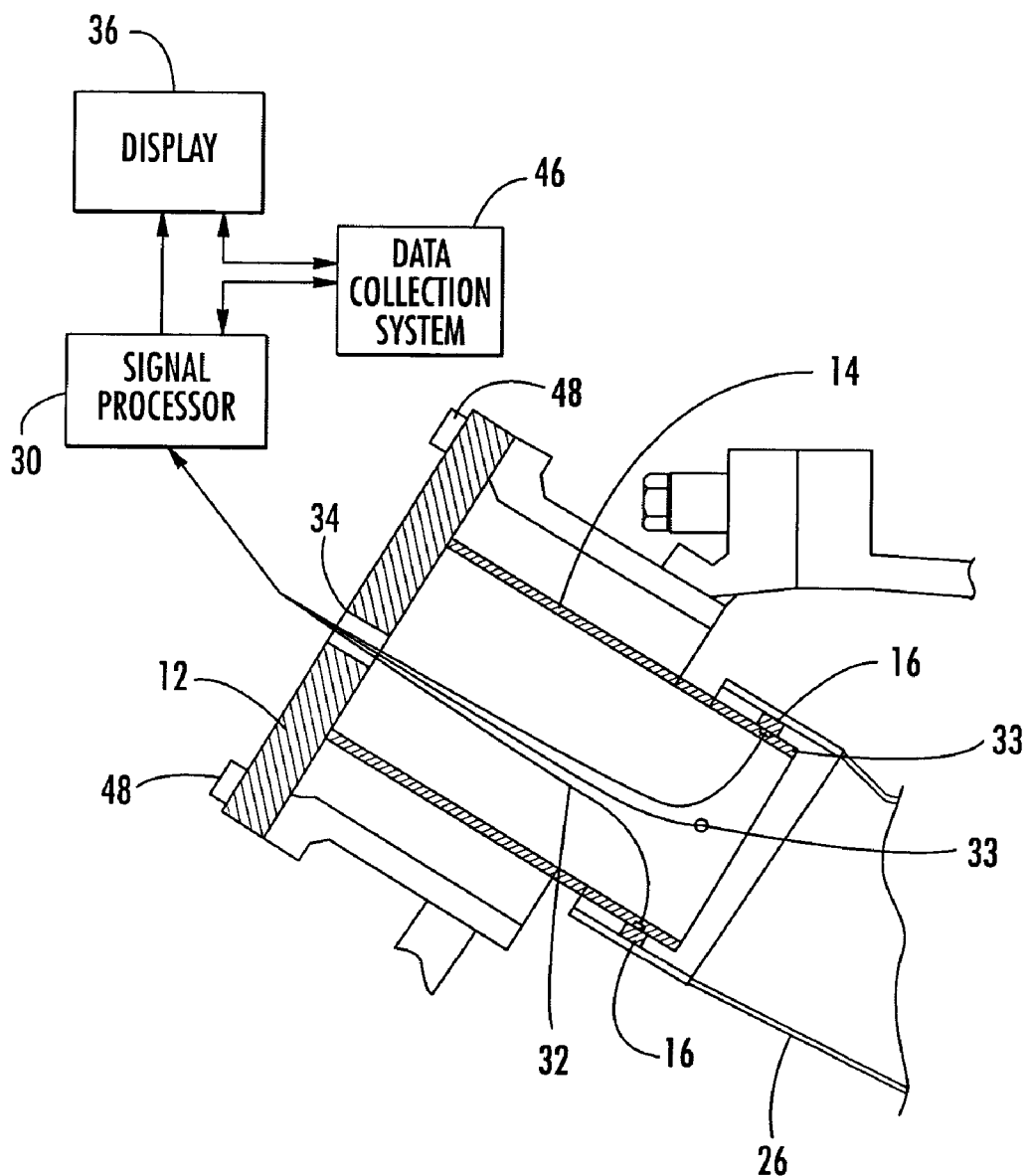
FIG. 4 is a cross-sectional view, partly schematic, of a fixture according to aspects of the invention.

Referring to FIG. 4, the plurality of pressure transducers 16 can be operatively connected to a signal processor 30 by, for example, wiring 32 or telemetry (not shown). When connected by wiring 32, it is preferred if openings 33 are provided in the mandrel 14 so that the wires 32 can extend through the interior of the mandrel 14 and exit through an opening 34 provided in the flange 12.

The signal processor 30 can generate an actual alignment location signal responsive to the signals received from the plurality of pressure transducers 16. For example, the signal processor 30 can convert the signals from the pressure transducers into a circular indication that would move along x–y axes in an amount and a direction corresponding to the relative magnitude and direction of any misalignment. The signal processor 30 can be one of central processing units, digital signal processors, or application specific integrated circuits. Again, the signal processor 30 can be any device that can convert the signals received from the pressure transducers 16 and generate an actual alignment location signal.

Figure 5A:
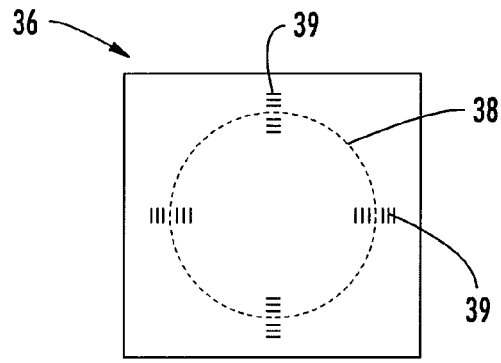
FIG. 5A is a front elevational view of a display according to aspects of the invention presenting a graphical image of a target alignment position including graduations.
Figure 5B:
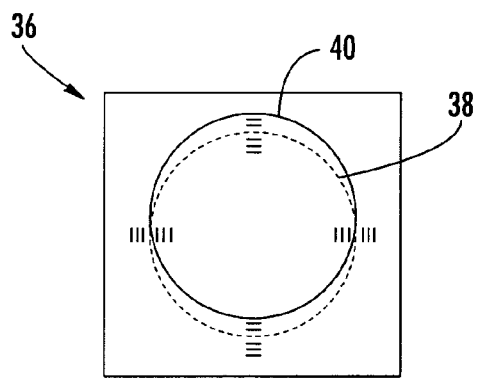
FIG. 5B is a front elevational view of a display according to aspects of the invention presenting a graphical image of a target alignment position including graduations and a graphical image of an actual alignment position, indicating that the transition is positioned too high.
Figure 5C:
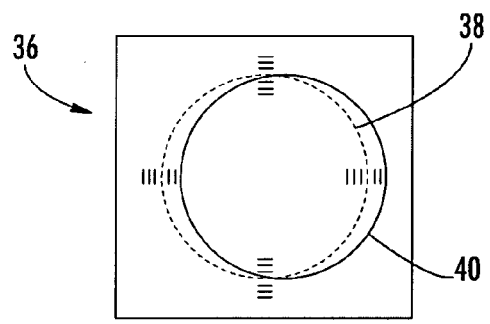
FIG. 5C is a front elevational view of a display according to aspects of the invention presenting a graphical image of a target alignment position including graduations and a graphical image of an actual alignment position, indicating that the transition is positioned too far to the right.

The fixture 10 according to aspects of the invention may further include a display 36. The display 10 can be any of a variety of devices such as a cathode ray tube (CRT), liquid crystal display (LCD), liquid crystal on silicon (LCOS) display or a Plasma display, to name a few. As shown in FIG. 5A, the display 36 can present a graphical image representative of the target alignment location 38. The display 36 can further include graphical images of graduations 39 so as to give an indication as to the measure of any misalignment. In addition, the display 36 can further present a graphical image representative of an actual alignment location 40 responsive to the actual alignment location signals received from the signal processor 30.

The presentment of these graphical images 38,40 by the display 36 can be portrayed electronically or physically. Examples of physical portrayal include the image being a part of the display housing such as an overlay template or an etching on the display screen. An electronic portrayal includes an electronic image generated on the screen. One or both of the graphical images 38,40 can be electronic. As for a physical portrayal of the graphical images 38,40, it is preferred if only the graphical image representative of the target alignment location 38 is physical.

In one embodiment, the graphical images representative of the target alignment location 38 and the actual alignment location 40 can be presented as circles, as shown in FIGS. 5A–5D. When in the form of a circle, the graphical image representative of the target alignment location 38 includes graduations 39 extending radially inward and outward from the image 38. The graduations 39 can be in localized areas or the graduations 39 can appear as circles concentric with the circle representative of the target alignment location 38.

Aside from circles, the graphical images 38,40 can appear in a variety of forms. For example, the graphical images representative of the target alignment location and the actual alignment location can be presented as cross-hairs or crossing horizontal and vertical lines (not shown). When such an image is displayed, the graphical image representative of the target alignment location includes graduations along axes of the cross-hairs.

Figure 5D:
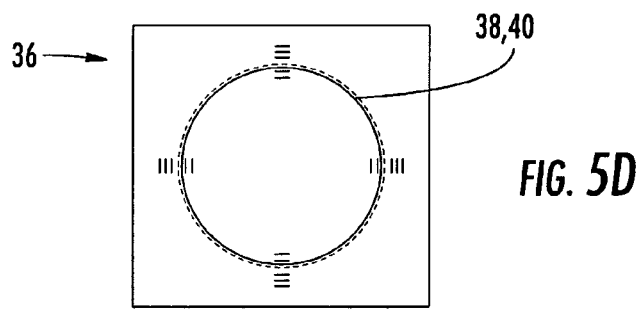
FIG. 5D is a front elevational view of a display according to aspects of the invention presenting a graphical image of a target alignment position including graduations and a graphical image of an actual alignment position, indicating that the transition is positioned within the acceptable alignment position.

Whatever the form, a user can view the movement of the graphical image of the actual alignment location 40 relative to the graphical image of the target alignment location 38 such that the user can make informed corrections to the position of the transition 26 until the graphical images 38,40 are substantially aligned (FIG. 5D). To help a user, the graphical images 38,40 are preferably distinguishable from each other. For example, the graphical image representative of the target alignment location 38 can appear in broken lines, and the graphical image representative of the actual alignment location 40 can appear in solid lines. Alternatively, the graphical images 38,40 can appear in different colors or different line thicknesses.

The fixture 10 can further include a data collection system 46, which can be operatively associated with the display 36 and/or signal processor 30. For example, the data collection system 46 can include a computer and a keyboard. In one embodiment, the data collection system 46 can be equipped for electronic data collection. Thus, an operator can use the data collection system 46 to selectively record information received from the display 46 and/or signal processor 30 as a way of verifying that the alignment was performed. For example, when proper alignment of the transition 26 is achieved, an operator can press a button (not shown) provided on the data collection system 46, which causes data signals from the display 36 and/or signal processor 30 to be recorded, providing objective evidence that the alignment was indeed performed.

Having described the individual components of the fixture and their assembly according to aspects of the present invention, one illustrative manner in which such a fixture can be used to align the inlet end of a transition with a combustor component will be described below. The following description is merely an example of a sequence in which the individual steps can occur. The described steps can be performed in almost any order and not every step described must occur.

Figure 3:
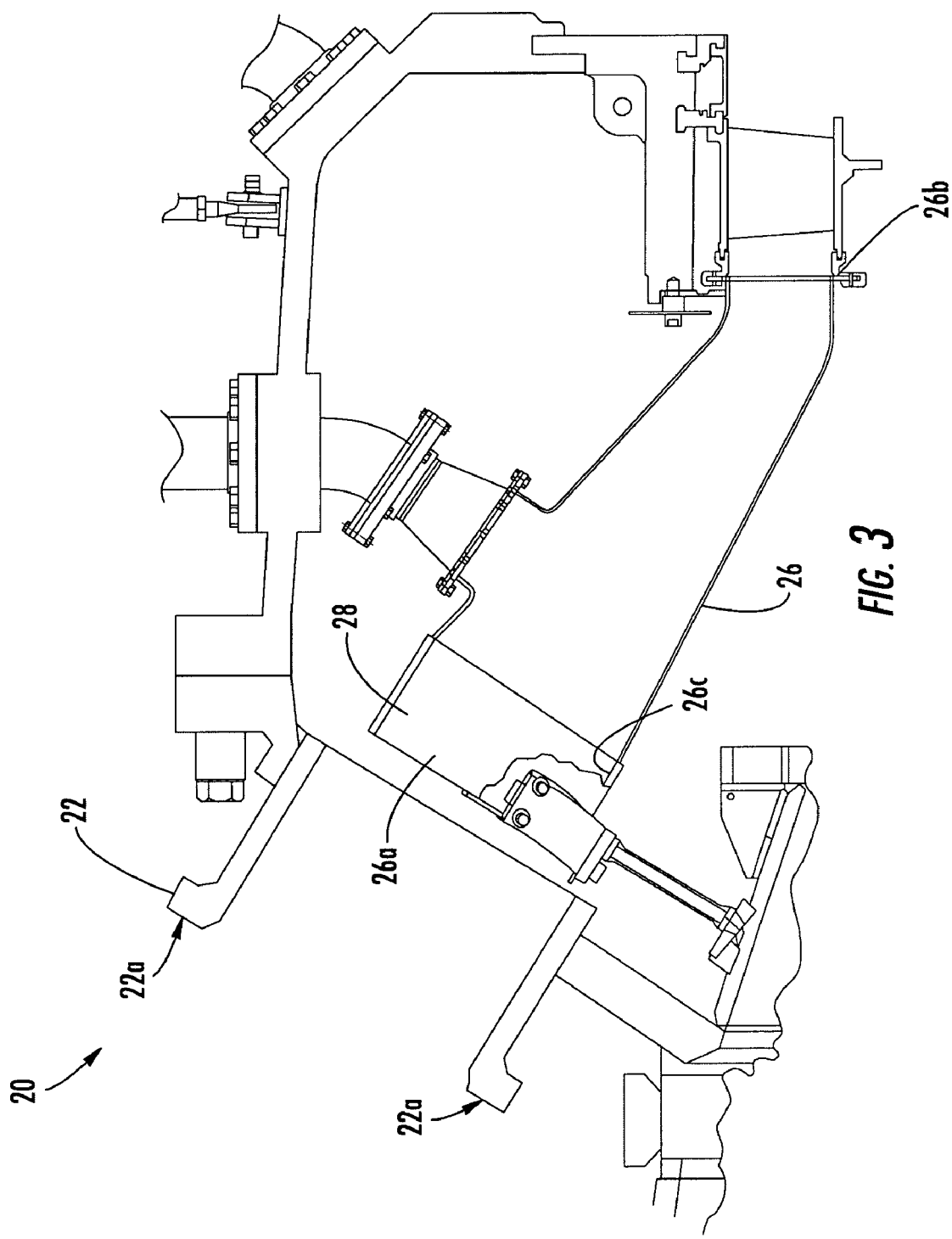
FIG. 3 is a cross-sectional view of a turbine engine, partially disassembled, in the general region between the combustor section and the turbine section.

FIG. 3 shows the general environment of the combustor. A component 22 from the combustor section 20 of a turbine engine is provided. Again, the component 22 can be almost any component 22 of the combustor section 20 such as the combustor portal. Preferably, the component 22 includes a flanged surface 22a. Further, a generally hollow transition duct 26 is provided. The transition duct can have an inlet end 26a, an outlet end 26b, and an inner periphery 26c. Again, the inlet end 26a of the transition 26 can be the inlet mouth or the inlet ring. Also, a fixture 10 according to aspects of the invention is provided.

As shown in FIG. 4, the fixture 10 can be mounted to the combustor section component 22 such that at least a portion of the mandrel 14 containing the plurality of pressure transducers 16 extends beyond the combustor component 22. For example, the flange 12 of the fixture 10 can be secured to the flange 22a of the portal 22 using bolts 48 such that the mandrel 14 of the fixture 10 extends axially through the portal 22 and a portion of the mandrel 14 extends beyond the portal 22.

Next, the inlet end 26a of the transition 26 can be placed over the extending portion of the mandrel 14 such that each of the plurality of pressure transducers 16 substantially engages the inner periphery 26c of the transition 26. As a result, the plurality of pressure transducers 16 can generate a signal in response to pressure exerted on the pressure transducers 16 by the transition 26.

A signal processor 30 can be operatively connected with the plurality of pressure transducers 16. The signal processor 30 can generate an actual alignment location signal responsive to the signals received from the plurality of pressure transducers 16. The signals generated by the signal processor 30 can be sent to a display 36 presenting a graphical image representative of the target alignment location 38. The display can further present a graphical image representative of an actual alignment location 40 responsive to the actual alignment location signal received from the signal processor. Thus, a user can compare the graphical image of the target alignment location 38 to the graphical image of the actual alignment location 40, and a user can discern the magnitude and direction of any misalignment between the graphical image of the target alignment location 38 and the graphical image of the actual alignment location 40. As noted earlier, these graphical images 38,40 can be presented as circles, cross-hairs or other images.

If the alignment is not within acceptance criteria, the position of the transition 26 can be adjusted, such as by incrementally moving the outlet end 26b of the transition 26. This adjustment and other steps can be repeated until the graphical image of the target alignment location 38 is substantially aligned with the graphical image of the actual alignment location 40. If provided, the data collection system 46 can be operated to record alignment information received from the signal processor 30 and/or display 36.

The fixture 10 according to aspects of the present invention can be calibrated by using the fixture 10 on a preexisting combustor component 22 and transition 26 pair that is known to be in substantial alignment. Such calibration can occur on any periodic basis such as semi-annually.

It will of course be understood that the invention is not limited to the specific details described herein, which are given by way of example only, and that various modifications and alterations are possible within the scope of the invention as defined in the following claims.

What is claimed is:

1. A fixture for aligning the inlet end of a transition with the combustor section of a turbine engine comprising:
   a flange adapted for mounting to a combustor section component of a turbine engine;
   a mandrel extending substantially perpendicularly from the flange, the mandrel being sized and shaped to correspond to a target alignment location of the transition, the mandrel having an outer peripheral surface;
   a plurality of pressure transducers spaced on the outer peripheral surface of the mandrel so as to correspond to the target alignment location of the transition, wherein the plurality of pressure transducers produce signals;
   a signal processor operatively connected with the plurality of pressure transducers, the signal processor generating an actual alignment location signal responsive to the signals received from the plurality of pressure transducers; and
   a display presenting a graphical image representative of the target alignment location, the display further presenting a graphical image representative of an actual alignment location responsive to the actual alignment location signal received from the signal processor,
   whereby a user can view the movement of the graphical image of the actual alignment location relative to the graphical image of the target alignment location such that the user can make informed adjustments to the position of the transition until the graphical images are substantially aligned.

2. The fixture of claim 1 wherein the display presentment of the graphical image representative of the target alignment location is an electrical portrayal.

3. The fixture of claim 1 wherein the display presentment of the graphical image representative of the target alignment location is a physical portrayal.

4. The fixture of claim 1 wherein the display presentment of the graphical image representative of the actual alignment location is an electrical portrayal.

5. The fixture of claim 1 wherein the graphical image representative of the target alignment location and the graphical image representative of the actual alignment location are presented as circles.

6. The fixture of claim 5 wherein the graphical image representative of the target alignment location includes graduations extending radially inward and outward from the circle.

7. The fixture of claim 1 wherein the graphical image representative of the target alignment location and the graphical image representative of the actual alignment location are presented as cross-hairs.

8. The fixture of claim 7 wherein the graphical image representative of the target alignment location includes graduations along axes of the cross-hairs.

9. The fixture of claim 1 wherein the signal processor is selected from the group consisting of central processing units, digital signal processors, or application specific integrated circuits.

10. The fixture of claim 1 further including a data collection system operatively associated with the display and the signal processor, wherein the data collection system is configured to selectively record alignment information received from at least one of the display and signal processor.

11. A method of aligning the inlet end of a transition with the combustor section of a turbine engine comprising the steps of:
(a) providing a combustor section component of a turbine engine;
(b) providing a generally hollow transition duct having an inlet end, an outlet end, and an inner periphery;
(c) providing a fixture, the fixture including a flange, a mandrel and a plurality of pressure transducers;
the flange being adapted for mounting to the combustor section component;
the mandrel extending substantially perpendicularly from the flange, the mandrel being sized and shaped to correspond to a target alignment location of the transition, the mandrel having an outer peripheral surface; and
a plurality of pressure transducers spaced on the outer peripheral surface of the mandrel so as to correspond to the target alignment location of the transition, wherein the plurality of pressure transducers produce signals;
(d) mounting the fixture to the combustor section component such that at least a portion of the mandrel including the plurality of pressure transducers extends beyond the combustor component;
(e) placing the inlet end of the transition over the extending portion of the mandrel such that each of the plurality of pressure transducers substantially engage the inner periphery of the transition;
(f) the plurality of pressure transducers generating a signal in response to pressure exerted on the transducers by the transition;
(g) providing a signal processor operatively connected with the plurality of pressure transducers, the signal processor generating an actual alignment location signal responsive to the signals received from the plurality of pressure transducers;
(h) providing a display operatively connected to the signal processor, the display presenting a graphical image representative of the target alignment location, the display further presenting a graphical image representative of an actual alignment location responsive to the actual alignment location signals received from the signal processor; and
(i) comparing the graphical image of the target alignment location to the graphical image of the actual alignment location.

12. The method of claim 11 further including the steps of:
(j) adjusting the transition so as to reduce any misalignment between the graphical image of the target alignment location and the graphical image of the actual alignment location.

13. The method of claim 12 further including the step of:
(k) repeating steps (f)–(j) until the graphical image of the target alignment location is substantially aligned with the graphical image of the actual alignment location.

14. The method of claim 13 further including the steps of:
(l) providing a data collection system operatively associated with the signal processor and the display, the data collection system configured to selectively record alignment information received from the signal processor and the display;
(m) operating the data collection system to record alignment information received from at least one of the signal processor and display.

15. The method of claim 12 wherein the step of adjusting the transition includes moving the outlet end of the transition.

16. The method of claim 11 wherein the fixture is mounted to the combustor section component using bolts.

17. The method of claim 11 wherein the graphical image representative of the target alignment location and the graphical image representative of the actual alignment location are presented as circles.

18. The method of claim 11 wherein the graphical image representative of the target alignment location and the graphical image representative of the actual alignment location are presented as cross-hairs.

19. A system for aligning the inlet end of a turbine engine transition duct comprising:
a generally hollow turbine engine transition duct having an inlet end, an outlet end, and an inner periphery;
a fixture having a flange, a mandrel extending substantially perpendicularly from the flange, the mandrel having an outer peripheral surface; and
a plurality of pressure transducers circumferentially spaced on the outer peripheral surface of the mandrel, wherein at least a portion of the mandrel including the pressure transducers is received within the inlet end of the transition so that each of the plurality of pressure transducers engages the inner periphery of the transition duct only in a region proximate the inlet end, and such that the mandrel physically holds the inlet end of the transition duct in position wherein the plurality of pressure transducers produce signals.

20. The system of claim 19 wherein the mandrel is substantially cylindrical.

* * * * *